US005083620A

United States Patent [19]

Fushiya et al.

[11] Patent Number: 5,083,620

[45] Date of Patent: Jan. 28, 1992

[54] CORDLESS POWER DRIVEN TOOL

[75] Inventors: Fusao Fushiya; Michio Okumura, both of Anjo, Japan

[73] Assignee: Makita Electric Works, Ltd., Anjo, Japan

[21] Appl. No.: 616,606

[22] Filed: Nov. 21, 1990

[30] Foreign Application Priority Data

Dec. 28, 1989 [JP] Japan ........................ 1-343986

[51] Int. Cl.[5] ........................ B23B 45/02

[52] U.S. Cl. ........................ 173/163; 173/12

[58] Field of Search ........................ 173/12, 163; 81/474; 310/50

[56] References Cited

U.S. PATENT DOCUMENTS

| | | | |
|---|---|---|---|
| 1,990,035 | 2/1935 | Kratz et al. | 173/163 |
| 2,406,389 | 8/1946 | Lee | 173/163 |
| 3,120,845 | 2/1964 | Horner | 173/163 |
| 4,823,885 | 4/1989 | Okumura | 173/12 |
| 4,871,033 | 10/1989 | Odoni et al. | 173/12 |
| 4,930,583 | 6/1990 | Fushiya et al. | 173/109 |

FOREIGN PATENT DOCUMENTS

| | | | |
|---|---|---|---|
| 3342880 | 6/1985 | Fed. Rep. of Germany | 173/163 |

*Primary Examiner*—Frank T. Yost
*Assistant Examiner*—John M. Husar
*Attorney, Agent, or Firm*—Dennison, Meserole, Pollack & Scheiner

[57] ABSTRACT

A cordless power driven tool includes a body having a handle at the rearward portion thereof, a spindle supported within the body and having a chuck for retaining a bit at the forward end thereof, a motor having an output shaft and accommodated within the body, and power transmission mechanism interposed between the output shaft of the motor and the spindle. The motor is positioned laterally or downwardly of the spindle such that the output shaft of the motor is substantially parallel to the spindle.

2 Claims, 2 Drawing Sheets

CORDLESS POWER DRIVEN TOOL

BACKGROUND OF THE INVENTION

1. Field of the Invention

The present invention relates to a cordless power driven too such as a cordless power driven drill and a cordless power driven driver.

2. Description of the Prior Art

In general, a cordless power driven tool includes a body having a handle at the rear portion thereof, a spindle supported within the body and having a chuck for retaining a bit such as a drill bit and a driver bit at the forward end thereof, a motor accommodated within the body, a power transmission mechanism interposed between an output shaft of the motor and the spindle.

Japanese Laid-Open Patent Publication No. 1-240279 discloses a cordless power driven tool in which a motor is disposed rearwardly of gear means for transmitting power to a spindle having at the forward end threof a chuck for retaining a bit. An output shaft of the motor is positioned on substantially the same axis as that of the spindle. A handle is formed at the rear portion of the body and has D-shaped configuration so as to provide a space for a hand of an operator to be inserted. A grip portion of the handle is positioned perpendicular to the spindle, so that the bit can be pressed on a work perpendicular thereto.

In the above prior art cordless power driven tool, the motor is disposed rearwardly of the spindle as well as the gear means and therefore, a portion of the body extending from the chuck to the handle becomes long. This may cause difficulties in handling the cordless power driven tool by grasping the handle, so that the power driven tool cannot be easily operated. Further, for this reason, the bit may offset against a work to be machined. For example, in the case of a cordless power driven driver, a screw may obliquely enter a work such as wood, thereby causing inadequate screwing. In the case of a cordless power driven drill, a hole is formed obliquely in the work, so that the machining operation cannot be reliably performed.

SUMMARY OF THE INVENTION

It is, accordingly, an object of the present invention to provide a cordless power driven tool which is easy to handle while grasping the handle.

It is another object of the present invention to provide a cordless power driven tool which can be reliably operated to machine a work without rendering offset of a bit against the work.

According to the present invention, there is provided a cordless power driven tool comprising a body having a handle at the rearward portion thereof, a spindle supported within the body and having a chuck for retaining a bit at the forward end thereof, a motor having an output shaft and accommodated within the body, and power transmission mechanism interposed between the output shaft of the motor and the spindle. The motor is positioned laterally or downwardly of the spindle such that the cut put shaft of the motor is substantially parallel to the spindle, so that the center of the gravity of the body can be positioned in the vicinity of the handle.

In a preferred embodiment of the present invention, the motor may be positioned substantially vertically below the spindle.

The body may include a forward portion accommodating the spindle, the power transmission means and the motor therein, and a rearward portion forming the handle. A space is formed between the forward portion and the rearward portion for insertion of fingers of an operator. The handle extends in a direction substantially perpendicular to the spindle.

The spindle and the motor are disposed within the upper portion and the lower portion of the forward portion of the body, respectively.

The lower portion of the handle accommodates a battery pack for supplying power to the motor.

The power transmission mechanism includes a clutch device mounted on a power transmission shaft disposed between the spindle and the output shaft of the motor and extending in parallel relation therewith, and a speed change device disposed at the rear portion of the spindle.

The invention will become more fully apparent from the claims and the description as it proceeds in connection with drawings.

DETAILED DESCRIPTION OF THE PREFERRED EMBODIMENT

Figure 1:
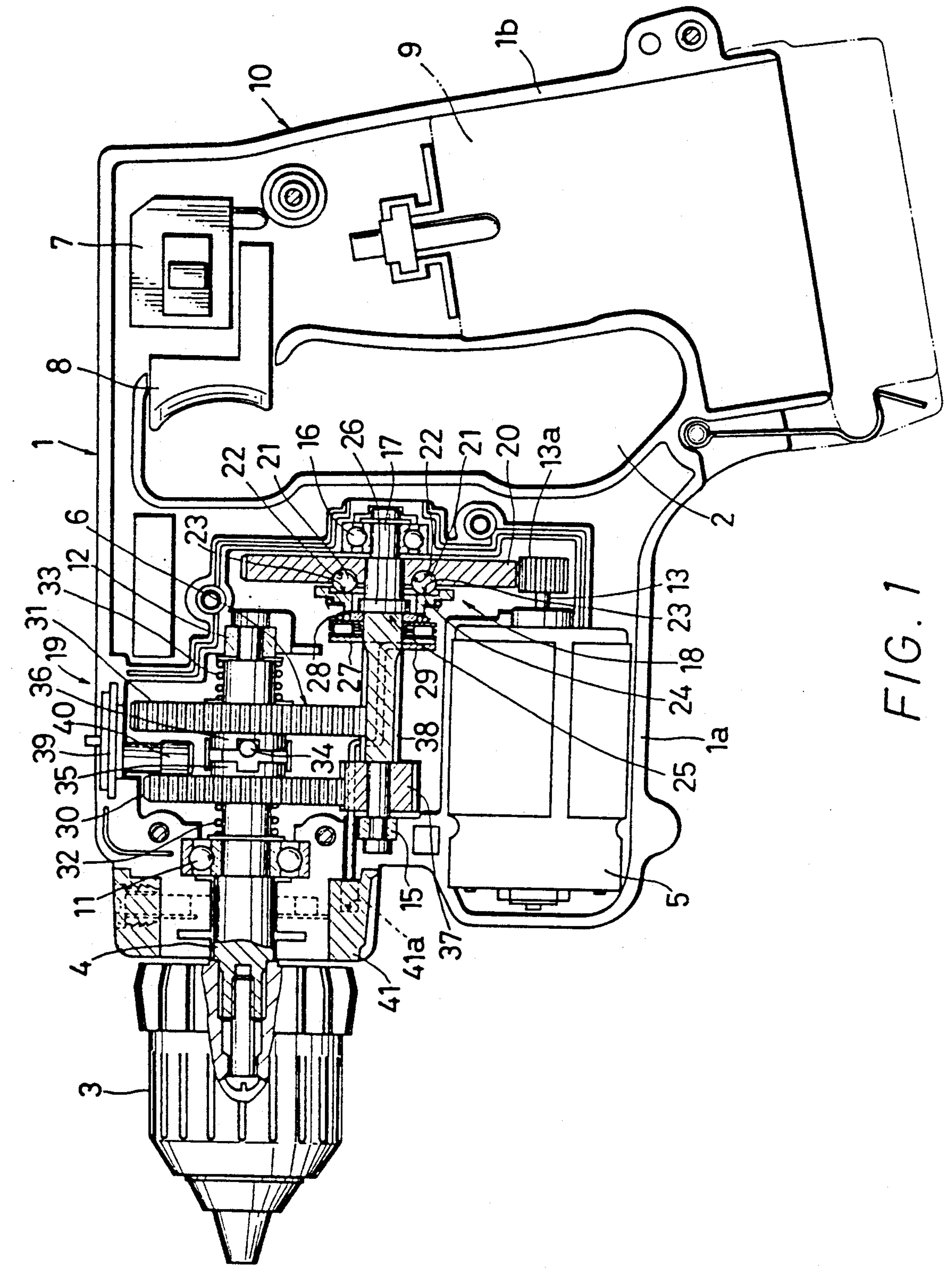
FIG. 1 is a vertical sectional view of a cordless power driven drill and screwdriver according to an embodiment of the present invention.

Referring to FIG. 1, there is shown a cordless power driven drill and screwdriver according to an embodiment of the present invention.

The power driven drill and screwdriver has a hollow body 1 which can be vertically split into two parts. The body 1 is formed with a space 2 which are opened at both sides perpendicular to the sheet showing FIG. 1. The body 1 has a forward portion 1*a* and rearward portion 1*b* which are connected with each other at the upper position and the lower position of the space 2. The forward portion 1*a* accommodates a spindle 4 having a chuck 3 at the forward end thereof for retaining a drill bit or a driver bit (not shown), a motor 5 for driving the spindle 4 and a power transmission mechanism 6 interposed between the motor 5 and the spindle 4. The rearward portion 1*b* accommodates at the upper portion thereof a switch 7 for starting or stopping the motor 5, and a trigger 8 partly projecting into the space 2 for actuation by an operator to operate the switch 7. The reaward portion 1*b* further accommodates at the lower portion thereof a battery pack 9 for supplying electric power to the motor 5 through the switch 7. The rearward portion 1*b* forms a handle 10 in cooperation with the space 2. The handle 10 extends substantially perpendicular to the spindle 4 or substantially vertically, so that the operator can easily grasp the handle 10 by inserting his fingers into the space 2. In connection with this, the trigger 8 projects into the space 2 at the upper portion of the space 2, so that the operator can easily actuate the trigger 8 by his forefinger.

The construction and arrangement of the spindle 4, the motor 5 and the power transmission mechanism 6 disposed between these components will now be described.

The spindle 4 extends in parallel to the upper surface of the forward portion 1*a* and is rotatably supported by the forward portion 1a via bearings 11, 12. The trigger 8 is positioned the axis of the spindle 4, so that the operator can reliably position the bit perpendicular to a work (not shown) and press it on the work by grasping the handle 10. The motor 5 is horizontally positioned at the lower portion of the forward portion 1a, and an output shaft 13 of the motor 5 is positioned directly under the spindle 4 and extends substantially parallel to the spindle. The output shaft 13 projects rearwardly from the motor 5 to a position slightly rearward of the rear end of the spindle 4.

The power transmission mechanism 6 includes a power transmission shaft 17, a clutch device 18 and a speed change device 19. The power transmission shaft 17 is positioned between the spindle 4 and the motor 5 and directly under the spindle 4. The power transmission shaft 17 extends parallel to the spindle 4 and is rotatably supported by bearings 15 and 16 at the forward end and the reaward end, respectively, such that the power transmission shaft 17, the spindle 4 and the output shaft 13 of the motor 5 are positioned in the same plane. The forward end and the rearward end of the power transmission shaft 17 are positioned slightly rearwardly of the forward end of the motor 5, and slightly rearwardly of the output shaft 13 of the motor 5, respectively. The position of the rearward end of the power transmission shaft 17 is determined in consideration of the position of a first clutch disc 20 of the clutch device 18 which will be hereinafter explained and the mounting of the bearing 16. The space 2 is formed directly rearward of the mounting portion of the bearing 16 of the forward portion 1a.

The clutch device 18 is interposed between the power transmission shaft 17 and the spindle 4 and is disposed at the rear end of the power transmission shaft 17. The construction of the clutch device 18 will be hereinafter described.

A first clutch disc 20 is rotatably mounted on the rear end of the power transmission shaft 17. The first clutch disc 20 has an outer gear portion which engages a gear 13a fixed to the output shaft 13 of the motor 5. The first clutch disc 20 is formed with four recesses 22 which are apart from each other at an angle of 90° in a circumferential direction for receiving four balls 21 (only two balls are shown in the drawing), respectively. The balls 21 are retained between the first clutch disc 20 and a second clutch disc 24 slidably mounted on the power transmission shaft 17. The second clutch disc 24 includes four recesses 23 which are opposed to the recesses 22 of the first clutch disc 20 and are shallower than the recesses 22. The second clutch disc 24 is movable in the axial direction of the power transmission shaft 17 through a pin 26 engaged with an elongated slot 25 formed on the power transmission shaft 17 in the axial direction. A spring carrier 27 is slidably mounted on the power transmission shaft 17. A spring 28 is interposed between the spring carrier 27 and the second clutch disc 24 so as to force the second clutch disc 24 toward the first clutch disc 20. A slider 29 is fixed to the spring carrier 27 and is movable in the axial direction together with the spring carrier 27. An adjuster ring 41 is rotatably mounted on the forward end cf the forward portion 1a of the body 1 opposed to the chuck 3. The adjuster ring 41 has an axial recess 41a formed within a suitable range in a circumferential direction. The depth of the recess 41a gradually changes in the circumferential direction. The forward end of the slider 29 is inserted into the recess 41a and abuts on the bottom thereof. Therefore, the abutting position of the slider 29 on the bottom of the recess 41a changes according to the rotational position of the adjuster ring 41, so that the slider 29 can change its axial position. Thus, the force for retaining the balls 21 between the first clutch disc 20 and the second clutch disc 23 can be selectively determined by the adjustment of rotational position of the adjuster ring 41.

The clutch device 18 thus constructed can transmit rotation of the output shaft 13 of the motor 5 in a forward direction or vice versa to the power transmission shaft 17 through balls 21. Further, in the case that the rotation of the power transmission shaft 17 is prevented by an excessive load determined by the adjuster ring 41, the balls 21 will disengage from the recesses 23 of the second clutch disc 24 and the first clutch disc 20 runs idle relative to the second clutch disc 24.

The construction of the speed change device 19 will now be explained. A first gear 30 of small diameter and a second gear 31 of large diameter are mounted on the spindle 4 and are movable in the axial direction of the spindle 4. These gears 30, 31 are urged by springs 32, 33 toward each other, respectively. As described above, the rear end of the spindle 4 is positioned forwardly of the rear end of the output shaft 13. Thus, the first gear 30, the second gear 31 and the springs 32, 33 are disposed so that they do not extend beyond the rear end of the motor 5. A pin 34 is fixed to the spindle 4 between the first gear 30 and the second gear 31 and radially protrudes from the spindle 4. The first gear 30 and the second gear 34 have engaging portions 35, 36 opposed to each other for engaging the pin 34, respectively. A pinion 37 is fixed to the forward portion of the power transmission shaft 17 for engaging the first gear 30. A spline 38 is provided on the power transmission shaft 17 and is in engegement with the second gear 31. A shifter 39 is mounted at the upper portion of the forward portion 1a of the body 1 for moving the first gear 30 or the second gear 31 along the spindle 4. The shifter 39 includes a downwardly extending eccentric pin 40 which changes its position forwardly or rearwardly according to the rotation of the shifter 39. By changing the position of the eccentric pin 40, the first gear 30 or the second gear 31 may be shifted against the corresponding spring 32, 33, so that only one of the engaging portion 35 and the engaging portion 36 can engage the pin 34. For example, when the first gear 30 is shifted forwardly by the shifter 39 against the spring 32 as shown in FIG. 1, the engaging portion 35 of the first gear 30 is disengaged from the pin 34, and the first gear runs idle. On the other hand, the second gear 31 is kept in engagement with the pin 34 by the spring 33, so that the rotation of the power transmission shaft 17 is transmitted to the spindle 4 through the spline 38 and the second gear 31. When the second gear 31 is shifted against the spring 33 so as to disengage the engaging portion 36 from the pin 34, the rotation of the power transmission shaft 17 is transmitted to the spindle 4 through the pinion 37 and the first gear 30. The gear ratio of the second gear 31 to the spline 38 is larger than that of the first gear 30 to the pinion 37, so that the spindle 4 rotates at low speed in the former case, while it rotates at high speed in the latter case.

In the above embodiment, the motor 5 is horizontally positioned at the lower position of the forward portion 1a, and an output shaft 13 of the motor 5 extends substantially parallel to the spindle 4. Therefore, the space 2 can be formed immediately rearward of the spindle 4, so that the distance between the bit and the handle portion 10 can be shortened. Thus, the power driven drill and screwdriver can be easily handled while grasping the handle portion 10. Further, the power driven tool can be reliably operated to machine a work without rendering offset of the bit against the work.

Further, in the above embodiment, the clutch device 18 is disposed between the motor 5 and the power transmission shaft 17. The power transmission shaft 17 is disposed between the spindle 4 and the motor 5, and the clutch device 18 is mounted at the rear portion of the power transmission shaft 17. Thus, the clutch device 18 is so constructed that its length in the axial direction does not exceed the length of the power transmission shaft 17, and the space 2 is located immediately rearward of the clutch device 18. Additionally, the speed change device 19 is also positioned not to exceed the rear end of the motor 5. Therefore, the provision of the clutch device 18 and the speed change device 19 does not influence the axial length of the forward portion 1*a* of the body 1. By such construction as well as the aforementioned arrangement of the motor 5, the power driven drill may have simple construction.

Figure 2:
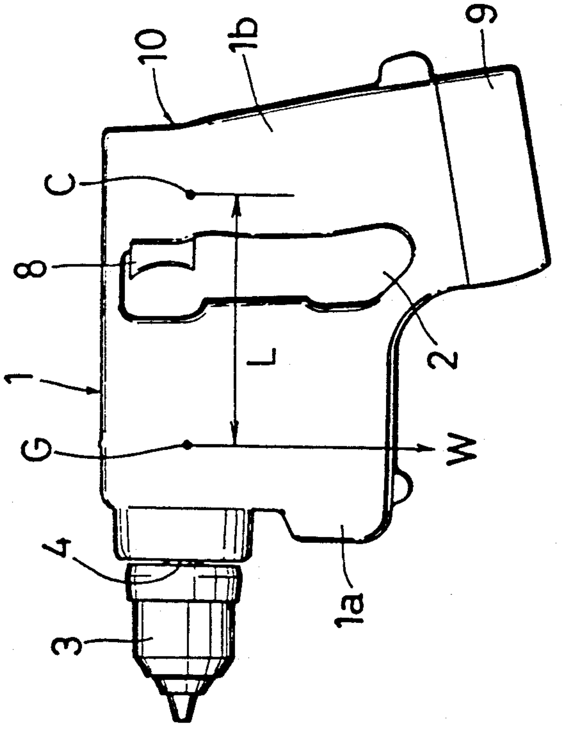
FIG. 2 is a schematic side view of the cordless power driven drill and screwdriver shown in FIG. 1 illustrating a moment of force applied to a handle of the drill and screwdriver.

Since in the above embodiment the distance between the bit and the handle portion 10 can be shortened, the distance L between the center of gravity G and the center C of the handle portion 10 as shown in FIG. 2 can be also shortened. Therefore, the following moment M which is applied to the handle portion 10 can be reduced:

$$M = W \times L \text{ (W: Weight of the body 1)}$$

The moment applied to the handle portion 10 by the weight of the motor 5, the clutch device 18 and the speed change device 19 other than the body 1 may be also reduced for the same reason. Therefore, the power driven tool can be further reliably operated to machine the work.

Although in the above embodiment, the spindle 4, the power transmission shaft 17 and the output shaft 13 of the motor 5 are positioned in the same vertical plane, the power transmission shaft 17 and the output shaft 13 may be positioned leftwardly or rightwardly relative to the spindle or relative to each other in consideration of the weight balance of the overall power driven drill and screwdriver. Thus, the power transmission shaft 17 and the output shaft 13 may be positioned laterally or downwardly of the spindle 4 such that they are substantially parallel to the spindle 4.

While the invention has been described with reference to a preferred embodiment thereof, it is to be understood that modification or variations may be easily made without departing from the scope of the present invention which is defined by the appended claims.

What is claimed is:

1. In a cordless power driven tool comprising a body having a handle, a spindle supported within said body and having a chuck for retaining a bit at one end thereof, a motor having an output shaft and mounted within said body, power transmission means interposed between the output shaft of said motor at the opposite end of said spindle from said chuck, the improvement comprising a body configuration including a forward portion accommodating said spindle, said power transmission means and said motor, and a rearward portion forming said handle, said handle extending substantially vertically relative to said spindle and including upper and lower portions, the lower portion of said handle being configured to house a battery pack, means defining a space between said forward portion and said rearward portion of said body configured to accommodate the hand of an operator grasping said handle, said motor being positioned substantially vertically beneath said spindle and with an output shaft of said motor extending in substantially parallel relation to said spindle, the rear end of said spindle and the rear part of said motor extending to a position adjacent a portion of said body opposite to said handle and said space, so that the distance between said spindle and said handle as well as the distance between said motor and said handle can be minimized.

2. The cordless power driven tool as defined in claim 1 wherein said power transmission means includes:

a clutch device mounted on a power transmission shaft disposed in parallel to said spindle; and a speed change device coaxially disposed at the rearward portion of said spindle.

* * * * *